United States Patent
Park et al.

(10) Patent No.: US 11,706,749 B2
(45) Date of Patent: Jul. 18, 2023

(54) COOPERATIVE RESOURCE ALLOCATION METHOD AND APPARATUS FOR DOWNLINK SIMULTANEOUS WIRELESS INFORMATION AND POWER TRANSFER NETWORK

(71) Applicant: Korea Advanced Institute of Science and Technology, Daejeon (KR)

(72) Inventors: Hyuncheol Park, Daejeon (KR); HongSun An, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 32 days.

(21) Appl. No.: 17/331,247

(22) Filed: May 26, 2021

(65) Prior Publication Data

US 2022/0174673 A1 Jun. 2, 2022

(30) Foreign Application Priority Data

Nov. 27, 2020 (KR) .................. 10-2020-0161818
Jan. 19, 2021 (KR) .................. 10-2021-0007421

(51) Int. Cl.
*H04L 12/28* (2006.01)
*H04W 72/0453* (2023.01)
(Continued)

(52) U.S. Cl.
CPC ....... *H04W 72/0453* (2013.01); *H02J 50/001* (2020.01); *H04L 5/0007* (2013.01)

(58) Field of Classification Search
CPC ..... H04B 5/0031; H04B 3/0037; H02J 50/80; H02J 50/001; H04L 5/0007; H04W 4/70; H04W 72/0453
(Continued)

(56) References Cited

U.S. PATENT DOCUMENTS

2018/0026820 A1* 1/2018 Kim .................. H02J 50/20
375/259
2018/0198488 A1* 7/2018 Tomasi ............... H04B 5/0056
(Continued)

FOREIGN PATENT DOCUMENTS

KR          10-1803035 B1    12/2017
KR     10-2018-0117079 B1    10/2018
(Continued)

OTHER PUBLICATIONS

Lu, et al., "Simultaneous Wireless information and Power Transfer Based on Joint Subcarrier and Power Allocation in OFDM Systems," IEEE Access, DOI: 10.1109/Access.2017.2671903, Mar. 28, 2017.
(Continued)

*Primary Examiner* — John Pezzlo
(74) *Attorney, Agent, or Firm* — Burns & Levinson LLP; Joseph M. Maraia; Marlo Schepper Grolnic (57) ABSTRACT

Cooperative resource allocation method and apparatus for downlink simultaneous wireless information and power transfer are proposed. A cooperative resource allocation method for downlink simultaneous wireless information and power transfer network, which is implemented through a central processor, according to one example of embodiments, may be configured to include allocating subcarrier for wireless information transfer and power transfer; and allocating power for wireless information transfer with the allocated subcarrier and divided transfer power.

16 Claims, 5 Drawing Sheets

(51) Int. Cl.
*H02J 50/00* (2016.01)
*H04J 1/16* (2006.01)
*H04L 5/00* (2006.01)

(58) Field of Classification Search
USPC .................................. 370/252, 329, 386, 430
See application file for complete search history.

(56) References Cited

U.S. PATENT DOCUMENTS

2021/0119726 A1* 4/2021 Kim .................... G06N 3/08
2022/0078790 A1* 3/2022 Park .................... H02J 50/20

FOREIGN PATENT DOCUMENTS

| KR | 1020190080728 | | 7/2019 |
| KR | 10-2113553 | B1 | 5/2020 |
| KR | 10-2119849 | | 6/2020 |
| KR | 10-2141717 | B1 | 8/2020 |

OTHER PUBLICATIONS

J. Park and B. Clerckx, "Joint wireless information and energy transfer in a two-user MIMO interference channel," IEEE Trans. Wireless Commun., vol. 12, No. 8, pp. 4210-4221, Aug. 2013.
X. Zhou, R. Zhang, and C. K. Ho, "Wireless information and power transfer in multiuser OFDM systems," IEEE Trans Wireless Commun., vol. 13, No. 4, pp. 2282-2294, Apr. 2014.
Korean Office Action dated Sep. 16, 2022, for related Application No. 10-2021-0007421, 5 pgs. (Korean Language Version).

\* cited by examiner

COOPERATIVE RESOURCE ALLOCATION METHOD AND APPARATUS FOR DOWNLINK SIMULTANEOUS WIRELESS INFORMATION AND POWER TRANSFER NETWORK

CROSS-REFERENCE TO RELATED APPLICATIONS

This application claims the priority benefit of Korean Patent Application No. 10-2020-0161818, filed on Nov. 27, 2020, and Korean Application No. 10-2021-0007421, filed on Jan. 19, 2021, in the Korean Intellectual Property Office, the disclosure of which is incorporated herein by reference.

BACKGROUND

1. Field of the Invention

The follow example embodiments relate to cooperative resource allocation method and apparatus for downlink simultaneous wireless information and power transfer network. This research was supported by the MSIT(Ministry of Science and ICT), Korea, under the ITRC(Information Technology Research Center) support program(IITP-2020-0-01787) supervised by the IITP(Institute of Information & Communications Technology Planning & Evaluation).

2. Description of Related Art

SWIPT (Simultaneous Wireless Information And Power Transfer) is a technology for meeting requirements of an EH (Energy Harvesting) receiver and an ID (Information Decoding) receiver by using characteristics of RF (Radio Frequency) signals which may transfer simultaneously information and power.

Difference of receiving sensitivity of the EH receiver and the ID receiver occurs difference of a wireless power transfer coverage and a wireless information transfer coverage, and signals from a EH transmitter act as a strong interference to the ID receiver.

Because of such problems, in the SWIPT, both of interference management technology and transfer technology for meeting high receiving sensitivity of the EH receiver are required.

[Non-patent literature 1] considers a situation where there are two users, one information transmitter, and one power transmitter. Here, the information transmitter considers only energy requirements and performs power allocation for information transfer, and an EAP (Energy Access Point) suggests ME (Maximal energy) technique and ML (Minimum leakage) technique, and finally suggests SLER (Signal-to-Leakage Energy Ratio) technique. This is a method for minimizing leakage power and maximizing energy in the EAP, which corresponds to an interference minimization technique that considers energy requirements.

[Non-patent literature 2] is a method for performing power allocation for multiple users in a broadcasting method. Since the corresponding technology adopts the broadcasting method, the interference signals are not considered.

PRIOR ART DOCUMENT

Non-Patent Literature

Non-patent literature 1: J. Park and B. Clerckx, "Joint wireless information and energy transfer in a two-user MIMO interference channel," *IEEE Trans. Wireless Commun.*, vol. 12, no. 8, pp. 4210-4221, Aug. 2013.

Non-patent literature 2: X. Zhou, R. Zhang, and C. K. Ho, "Wireless information and power transfer in multiuser OFDM systems," *IEEE Trans. Wireless Commun.*, vol. 13, no. 4, pp. 2282-2294, Apr. 2014.

SUMMARY

The example embodiments provide cooperative resource allocation method and apparatus for downlink simultaneous wireless information and power transfer network, which may maintain shape of an existing OFDM (Orthogonal Frequency Division Multiple) receiver without any additional functions such as removal of energy symbols in an ID receiver without influence of interference due to wireless power signals in the ID receiver, by performing wireless information transfer and wireless power transfer with transfer power divided to exclusive subcarrier by using characteristics of OFDM. Also, the example embodiments provide cooperative resource allocation method and apparatus for downlink simultaneous wireless information and power transfer network, which may perform cooperative wireless power transfer in which transfer diversity is applied by using a predefined energy symbol, and thereby, increase receiving power in an EH receiver.

A cooperative resource allocation method for downlink simultaneous wireless information and power transfer network, which is implemented through a central processor, according to one example of embodiments may include allocating subcarrier for wireless information transfer and power transfer; and allocating power for wireless information transfer with the allocated subcarrier and divided transfer power.

A plurality of EAPs (Energy Access Point) may be arranged in a wireless power transfer coverage configured by a HAP (Hybrid Access Point) in order to overcome receiving sensitivity difference between an EH (Energy Harvesting) receiver and an ID (Information Decoding) receiver.

The allocating subcarrier may include first selecting subcarrier for wireless power transfer; and when the subcarrier is selected, allocating the remaining subcarrier to subcarrier for wireless information transfer according to a subcarrier splitting method.

The subcarrier splitting method may transfer information symbol and energy symbol with total transfer power divided to each exclusive subcarrier by using characteristics of OFDM (Orthogonal Frequency Division Multiple) with the EH receiver or ID receiver in the HAP.

The allocating subcarrier may select the subcarrier simultaneously meeting energy requirements of the EH receiver preset based on the subcarrier splitting method and maximizing data rate of the ID receiver.

The allocating subcarrier may set candidates of subcarrier by using weighting factor, and select subcarrier having a minimum channel gain between ID receivers in the HAP among the subcarrier candidates.

The allocating subcarrier may form the divided transfer power according to ratio by determining the ratio of transfer power to be used for wireless power transfer in the HAP.

The allocating power may perform cooperative wireless power transfer in which transfer diversity is applied by using predefined energy symbol, and increase receiving power in the EH receiver.

The allocating power may readjust the divided transfer power for wireless power transfer and wireless information transfer by considering energy secured through the subcarrier for wireless information transfer.

A cooperative resource allocation apparatus for downlink simultaneous wireless information and power transfer network according to another example of embodiments may include a subcarrier allocating unit for allocating subcarrier for wireless information transfer and power transfer; and a power allocating unit for allocating power for wireless information transfer with the allocated subcarrier and divided transfer power.

A plurality of EAPs (Energy Access Point) may be arranged in a wireless power transfer coverage configured by a HAP (Hybrid Access Point) in order to overcome receiving sensitivity difference between an EH (Energy Harvesting) receiver and an ID (Information Decoding) receiver.

The subcarrier allocating unit may first select subcarrier for wireless power transfer, and when the subcarrier is selected, allocate the remaining subcarrier to subcarrier for wireless information transfer according to a subcarrier splitting method.

The subcarrier splitting method may transfer information symbol and energy symbol with total transfer power divided to each exclusive subcarrier by using characteristics of OFDM (Orthogonal Frequency Division Multiple) with the EH receiver or ID receiver in the HAP.

The subcarrier allocating unit may select the subcarrier simultaneously meeting energy requirements of the EH receiver preset based on the subcarrier splitting method and maximizing data rate of the ID receiver.

The subcarrier allocating unit may set candidates of subcarrier by using weighting factor, and select subcarrier having a minimum channel gain between ID receivers in the HAP among the subcarrier candidates.

The subcarrier allocating unit may form the divided transfer power according to ratio by determining the ratio of transfer power to be used for wireless power transfer in the HAP.

The power allocating unit may readjust the divided transfer power for wireless power transfer and wireless information transfer by considering energy secured through the subcarrier for wireless information transfer.

The power allocating unit may perform cooperative wireless power transfer in which transfer diversity is applied by using the predefined energy symbol, and increase receiving power in the EH receiver.

According to example embodiments, it may provide cooperative resource allocation method and apparatus for downlink simultaneous wireless information and power transfer network, which may maintain shape of an existing OFDM (Orthogonal Frequency Division Multiple) receiver without any additional functions such as removal of energy symbols in an ID receiver without influence of interference due to wireless power signals in the ID receiver, by performing wireless information transfer and wireless power transfer with transfer power divided to exclusive subcarrier by using characteristics of OFDM.

Also, according to example embodiments, it may provide cooperative resource allocation method and apparatus for downlink simultaneous wireless information and power transfer network, which may perform cooperative wireless power transfer in which transfer diversity is applied by using a predefined energy symbol, and thereby, increase receiving power in an EH receiver.

BRIEF DESCRIPTION OF THE DRAWINGS

These and/or other aspects, features, and advantages of the present disclosure will become apparent and more readily appreciated from the following description of embodiments, taken in conjunction with the accompanying drawings of which.

DETAILED DESCRIPTION

Hereinafter, embodiments of the disclosure are described in detail with reference to the accompanying drawings. However, the described embodiments may be modified in various other forms, and the scope of the disclosure is not restricted by the following embodiments. Furthermore, the embodiments of the disclosure are provided to fully describe the disclosure to a person having ordinary knowledge in the art to which the disclosure pertains. The shapes, sizes, etc. of elements in the drawings may be exaggerated for a clear description.

In most wireless communication environments, RF (Radio Frequency) signals pass through multipath channels, and this has a frequency-selective characteristic in a frequency region. ISI (Inter Symbol Interference) due to such multipath channels reduces quality of receiving signals, and therefore, it causes difficulty in high-speed data transfer.

A transfer technique of OFDM (Orthogonal Frequency Division Multiple) have no interference between signals transferred through each subcarrier by transferring each signal to multiple subcarrier orthogonal to each other in a frequency region, and may support multiple users simultaneously by dividing and allocating multiple subcarrier to multiple users.

The optimum wireless power transfer in OFDM is obtained by allocating all transfer power to subcarrier having the biggest frequency channel gain, and on the other hand, the wireless information transfer occupies all subcarrier, and may achieve optimum performance by optimum WF (Water-Filling) method for wireless information transfer in which power is allocated proportional to the channel gain.

The multiple subcarrier transfer method such as OFDM is a typical technique for achieving high data transfer rate, and it is efficient transfer technique for optimizing wireless power transfer in a channel with frequency-selective characteristics due to multipath.

Therefore, it is possible to check the suitability of OFDM in a simultaneous wireless information and power signal transfer system.

Figure 1:
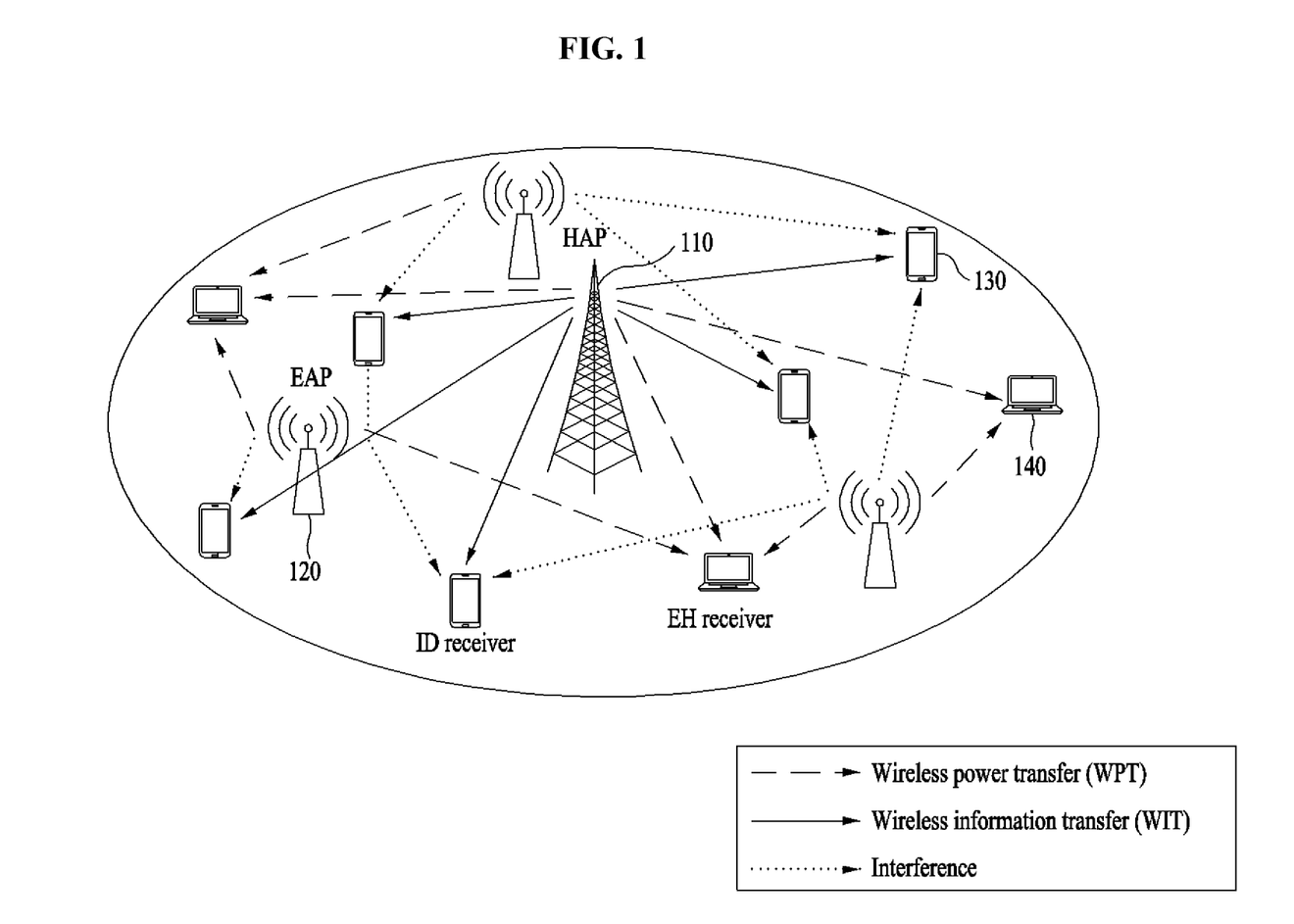
FIG. 1 illustrates a wireless network for downlink simultaneous wireless information and power transfer according to an example of embodiments.

FIG. 1 illustrates a wireless network for downlink simultaneous wireless information and power transfer according to an example of embodiments.

Referring to FIG. 1, a cooperative resource allocation method for downlink OFDM based wireless information and power signal transfer may be described.

Here, it may configure a wireless power network configured with one HAP (Hybrid Access Point) 110 and a plurality of EAPs (Energy Access Point) 120 to overcome receiving sensitivity of an ID (Information Decoding) receiver 130 and an EH (Energy Harvesting) receiver 140. The HAP 110 may transfer information symbol and energy symbol, and may basically configure a wider coverage than the EAP due to the low level of receiving sensitivity of the ID receiver 130. The EAP 120 transfers only energy symbol, and a plurality of them may be installed in order to satisfy the high receiving sensitivity of the EH receiver 140 within the coverage configured by the HAP 110.

According to example embodiments, a subcarrier splitting method for transferring energy symbol and information symbol with total transfer power divided to each exclusive subcarrier by using characteristics of OFDM may be provided with transfer methodology for simultaneous wireless information and power transfer without interference.

Also, since the energy symbol does not transfer any information, it may be predefined within the system, and a cooperative wireless power transfer technique in which transfer diversity is applied based on the predefined energy symbol may be provided.

In addition, considering requirements of the EH receiver 140, a subcarrier selection method for simultaneously meeting the requirements and maximizing data rate of the ID receiver 130 may be provided.

A repetitive cooperative resource allocation method is proposed based on the proposed subcarrier splitting method and subcarrier selection method, and through this, the given energy requirements may be met, and the data rate may be maximized.

In nth subcarrier, a frequency region for receiving signal of the ID receiver 130 and the EH receiver 140 may be represented, and it may be expressed as following equations.

$$y_{k_i,n} = h_{k_i,n}\sqrt{p_n}\,x_n + \underbrace{\sum_{m=1}^{M} g_{k_i,m,n}\sqrt{q_{m,n}}\,v_{m,n}}_{\text{interference from EAPs}} + n_{k_i,n}. \quad \text{[Equation 1]}$$

$$y_{k_e,n} = \underbrace{h_{k_e,n}\sqrt{p_n}\,x_n}_{\text{EH from HAP}} + \underbrace{\sum_{m=1}^{M} g_{k_e,m,n}\sqrt{q_{m,n}}\,v_{m,n}}_{\text{EH from EAPs}} + n_{k_e,n}. \quad \text{[Equation 2]}$$

Here, $h_{k_i,n}$ is a channel between the $k_i$th ID receiver 130 in the HAP 110, and $g_{k_i,m,n}$ is a channel between the $k_i$th ID receiver 130 in the mth EAP 120. Also, $x_n$ is transfer signal of the HAP 110, $p_n$ is transfer power of the HAP 110, $v_{m,n}$ is transfer signal of mth EAP 120, and $q_{m,n}$ is transfer power of mth EAP 120.

The transfer signal considering the cooperative wireless power transfer based on the subcarrier splitting method may be expressed as following equations.

[Equation 3]

$$x_n = \begin{cases} s_n^i, & n \in N_i \\ \dfrac{h_{k_e,n}^*}{|h_{k_e,n}^*|} s_n^e, & n \in N_e \end{cases} \quad \text{[Equation 3]}$$

$$v_{m,n} = \begin{cases} 0, & n \in N_i \\ \dfrac{g_{k_e,m,n}^*}{|g_{k_e,m,n}^*|} e_n^e, & n \in N_e \end{cases}, \forall m \quad \text{[Equation 4]}$$

Here, $N_i$ is an information subcarrier set, and $N_e$ is a power (energy) subcarrier set.

The data rate of the system achieved in the ID receiver 130 may be expressed as following equation.

$$R = \frac{1}{N} \sum_{k_i=1}^{K_i} \sum_{n \in N_i, k_i} \log_2\left(1 + \frac{|h_{k_i,n}|^2 p_n}{\sigma_n^2}\right) \quad \text{[Equation 5]}$$

Also, energy harvesting amount achieved in the EH receiver 140 may be expressed as following equation.

$$E_{k_e} = \zeta_{k_e} \cdot \mathbb{E}\left[\sum_{n=1}^{N} |y_{k_e,n}|^2\right] = \left(\sum_{n \in N_i} |h_{k_e,n}|^2 p_n + \sum_{n \in N_e} \left(|h_{k_e,n}|\sqrt{p_n} + \sum_{m=1}^{M} |g_{k_e,m,n}|\sqrt{q_{m,n}}\right)^2\right) \quad \text{[Equation 6]}$$

Here, $\zeta_k$ indicates RF-to-DC energy conversion efficiency in the $k_e$th EH receiver 140.

Figure 2:
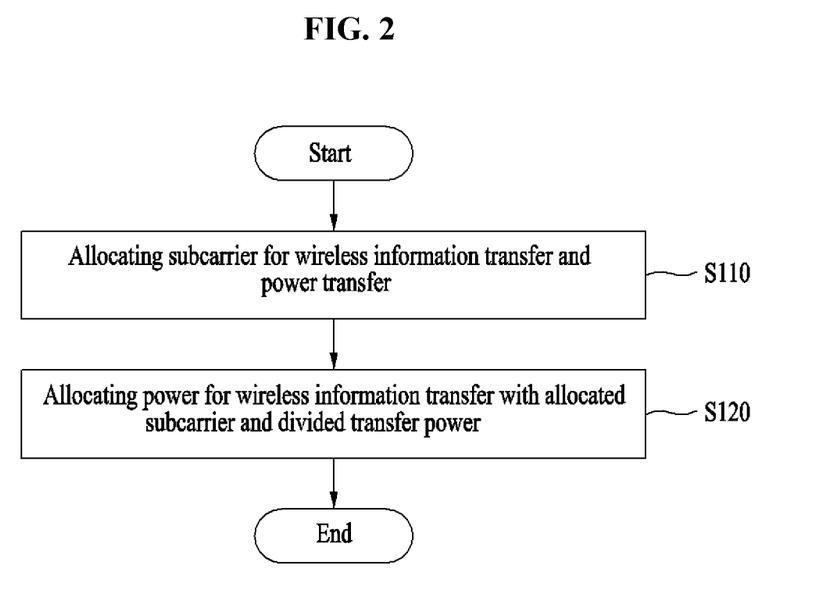
FIG. 2 is a flow chart illustrating a cooperative resource allocation method for downlink simultaneous wireless information and power transfer network according to an example of embodiments.

FIG. 2 is a flow chart illustrating a cooperative resource allocation method for downlink simultaneous wireless information and power transfer network according to an example of embodiments.

Referring to FIG. 2, a cooperative resource allocation method for downlink simultaneous wireless information and power transfer network, which is implemented through a central processor according to an example of embodiments, may be configured to include allocating subcarrier for wireless information transfer and power transfer S110, and allocating power for wireless information transfer with the allocated subcarrier and divided transfer power S120.

Here, the allocating subcarrier S110 may include first selecting subcarrier for wireless power transfer, and when the subcarrier is selected, allocating the remaining subcarrier to subcarrier for wireless information transfer according to a subcarrier splitting method.

Since the proposed SWIPT (Simultaneous Wireless Information And Power Transfer) technique performs wireless information transfer and wireless power transfer with transfer power divided to the exclusive subcarrier by using characteristics of OFDM (Orthogonal Frequency Division Multiple), there is no interference due to wireless power signals in the ID receiver 130, and the ID receiver may maintain the shape of the existing OFDM receiver without any additional functions such as removal of energy symbol.

Also, the cooperative wireless power transfer in which transfer diversity is applied by using the predefined energy symbol is performed, and thereby, receiving power in the EH receiver may be increased.

The example embodiments may support two users in a situation that the EH receiver and the ID receiver are mixed, and it may reduce the burden of performance degradation according to transfer method switching timing of transmitter/receiver.

Also, the example embodiments are based on TS (Timing-Switching) mode of the receiver, and may provide a more user-friendly technology as a method for switching transfer method according to the user's request in a given time slot. Here, TS (Time-switching) indicates SWIPT receiver structure of time exchange method.

The cooperative resource allocation method for downlink simultaneous wireless information and power transfer network according to an example of embodiments may describe a cooperative resource allocation apparatus for downlink simultaneous wireless information and power transfer network according to an example of embodiments with an example.

Figure 3:
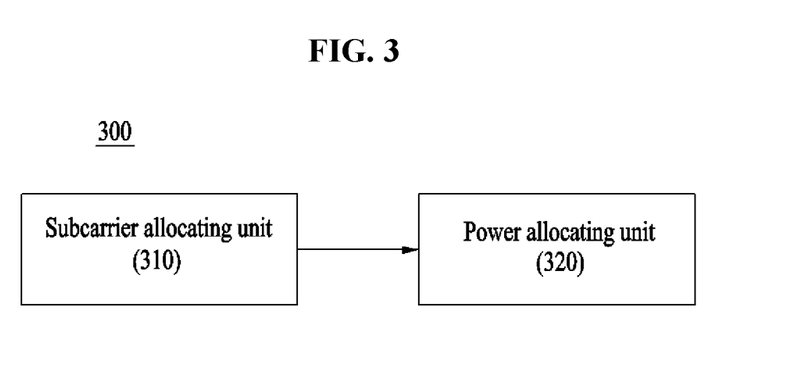
FIG. 3 is a block diagram illustrating a cooperative resource allocation apparatus for downlink simultaneous wireless information and power transfer network according to an example of embodiments.

FIG. 3 is a block diagram illustrating a cooperative resource allocation apparatus for downlink simultaneous wireless information and power transfer network according to an example of embodiments.

Referring to FIG. 3, a cooperative resource allocation apparatus for downlink simultaneous wireless information and power transfer network according to an example of embodiments may be configured to include a subcarrier allocating unit 310 and a power allocating unit 320. Here, a plurality of EAPs (Energy Access Point) may be arranged in a wireless power transfer coverage configured by a HAP (Hybrid Access Point) in order to overcome receiving sensitivity difference between an EH (Energy Harvesting) receiver and an ID (Information Decoding) receiver.

In Step S110, the subcarrier allocating unit 310 may allocate subcarrier for wireless information transfer and power transfer.

The subcarrier allocating unit 310 may first select subcarrier for wireless for wireless power transfer, and when the subcarrier is selected, may allocate the remaining subcarrier to subcarrier for wireless information transfer according to a subcarrier splitting method.

Here, the subcarrier splitting method may transfer information symbol and energy symbol with total transfer power divided to each exclusive subcarrier by using characteristics of OFDM (Orthogonal Frequency Division Multiple) with the EH receiver or ID receiver in the HAP. In other words, the subcarrier splitting method for avoiding interference may be provided by transferring each of energy symbol and information symbol by using transfer power divided to the exclusively allocated subcarrier in the downlink wireless information and power transfer system. In the downlink wireless power and information transfer network, multiple ID receivers may support through OFDMA (Orthogonal Frequency Division Multiple Access), and the EH receiver may support through TDMA (Time Division Multiple Access).

The subcarrier allocating unit 310 may provide a repetitive cooperative resource allocation method by selecting subcarrier simultaneously meeting energy requirements of the EH receiver present based on the subcarrier splitting method and maximizing data rate of the ID receiver. In performing cooperative resource allocation, weighting factor may be introduced to select subcarrier and allocate power transfer. More particularly, the subcarrier allocating unit 310 may set candidates of subcarrier by using weighting factor, and select subcarrier having a minimum channel gain between ID receivers in the HAP among the subcarrier candidates.

Accordingly, the subcarrier allocating unit 310 may form the divided transfer power according to ratio by determining the ratio of transfer power to be used for wireless power transfer in the HAP.

In Step S120, the power allocating unit 320 may allocate power for wireless information transfer with the allocated subcarrier and divided transfer power.

The power allocating unit 320 may readjust the divided transfer power for wireless power transfer and wireless information transfer by considering energy secured through the subcarrier for wireless information transfer. Here, the power allocating unit 320 may perform cooperative wireless power transfer in which transfer diversity is applied by using the predefined energy symbol, and increase receiving power in the EH receiver.

In performing two steps of the resource allocation method, first, resource for wireless power transfer is allocated, and wireless information transfer may be performed by using the remaining resource.

Here, minimum required accuracy of weighting factor may be proposed by guessing performance change according to accuracy of the weighting factor.

In the below, the cooperative resource allocation method and apparatus for downlink simultaneous wireless information and power transfer network according to one example of embodiments will be described in more detail.

In Step S110, the subcarrier allocating unit 310 may allocate subcarrier for wireless information transfer and power transfer.

The wireless power transfer in which transfer diversity is applied may occupy one subcarrier, and achieve optimum performance, and on the other hand, the optimum wireless information transfer may occupy most of subcarrier as optimum WF (Water-Filling) for wireless information transfer. Therefore, the example embodiments may first select subcarrier for wireless power transfer, and allocate the remaining subcarrier to the subcarrier for wireless information transfer by the subcarrier splitting method.

The subcarrier selection for wireless power transfer may select to meet given energy requirements and achieve maximum data rate by considering the energy requirements of the EH receiver.

The subcarrier candidates for the energy subcarrier set may be selected by using the following equation.

$$N_{e,k_e}^{cand} = \left\{ n \in N \;\middle|\; \max\!\left(E_{k_e} - \left(\beta_{k_e}|h_{k_e,n}| + \sum_{m=1}^{M}|g_{k_e m,n}|\right)^2 P_{max},\, 0\right) = 0 \right\}, \;\forall k_e$$ [Equation 7]

With the selected candidates, the following initial weighting factor may be obtained by bisection method.

$$\beta_{k_o}^{(0)} = \min\{\beta_{k_o} \in [0,1] \;\|\; N_{e,k_e}^{cand}\,|\neq 0\},\;\forall k_e$$ [Equation 8]

The initial weighting factor is obtained, the subcarrier candidates are represented as $N_{e,k_e}^{cand}$, and among the set, the final energy subcarrier may be selected through the following equation.

$$\overline{n}_{e,k_e} = \min_{\forall n \in N_{e,k_e}^{cand}} \left( \max_{\forall k_i} |h_{k_i,n}|^2 \right),\;\forall k_e$$ [Equation 9]

When the energy subcarrier is determined, the subcarrier for wireless information transfer may be determined as $N_i = N \backslash N_e$ according to the subcarrier splitting method.

Through the corresponding step, ratio of transfer power to be used for wireless power transfer in the HAP is determined as $\beta^{(O)}$, and each exclusive subcarrier set for wireless power and information transfer may be also determined.

In Step S120, the power allocation unit 320 may allocate power for wireless information transfer with the allocated subcarrier and divided transfer power.

After completing Step S110, the divided transfer power of the HAP may be expressed as the follows.

$$P_{EH}^{(l)} = \sum_{n \in N_e} p_n = (\beta^{(l-1)})^2 P_{max},$$ [Equation 10]

$$P_{ID}^{(l)} = \sum_{n \in N_i} p_n (1 - (\beta^{(l-1)})^2) P_{max}.$$ [Equation 11]

Here, if l=1 is substituted, the initial division power may be obtained.

The optimum power allocation for wireless information transfer may be performed by using the remaining resource after Step S110. Since the energy requirements of the EH receiver are met in Step S110, here, the optimum power allocation for wireless information transfer may be the optimum WF for wireless information transfer, and this may be expressed as following equation.

$$p_n^{id(l)*} = \max\left(\left(\frac{1}{\lambda N \ln 2} - \frac{\sigma_n^2}{|h_{k_i,n}|^2}\right), 0\right), n \in N_{i,k_i}$$ [Equation 12]

Since the ID receiver performs information symbol recovery in other subcarrier excluding energy subcarrier, it may receive information signal having no interference without a special interference cancellation process in the ID receiver.

Unlike the ID receiver performing signal recovery in particular subcarrier, the EH receiver may receive energy from all subcarrier. Therefore, the weighting factor $\beta^{(i)}$ should be updated by considering energy harvested by subcarrier performing wireless power transfer.

Such process may be repeated until the weighting factor converges within a predefined error range.

Figure 4:
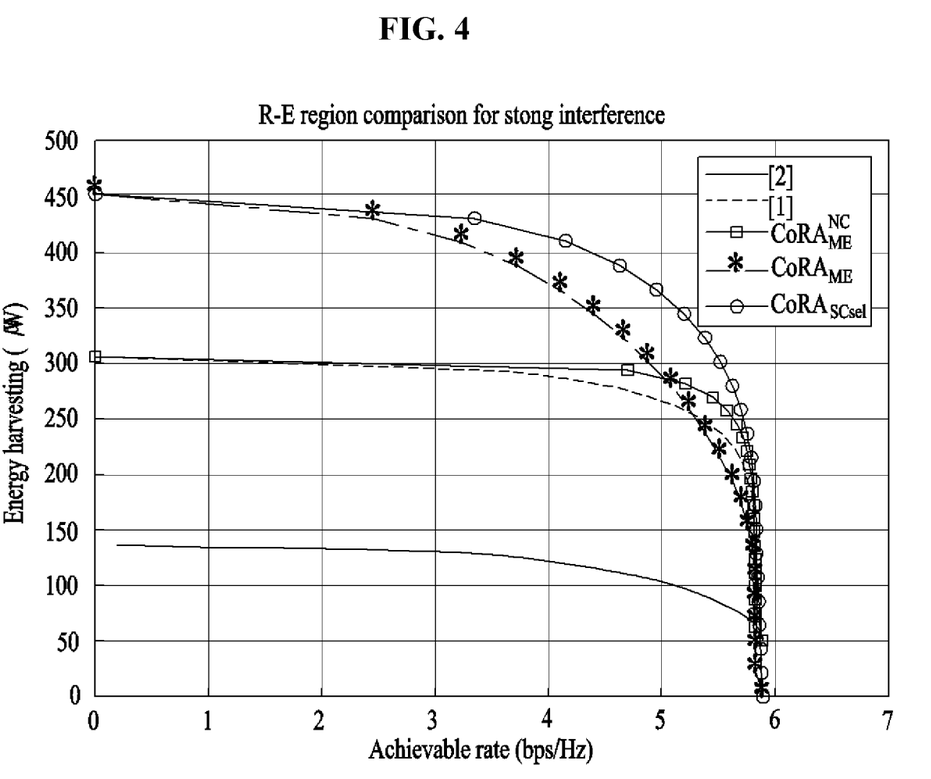
FIG. 4 is an experimental result for comparison with existing techniques according to an example of embodiments.

FIG. 4 is an experimental result for comparison with existing techniques according to an example of embodiments.

Referring to FIG. 4, for comparing with existing techniques, it is an experimental result in case that the HAP, the EAP, the ID receiver, and the EH receiver are all one.

Here, [1] is above described [Non-patent literature 1], and [2] is [Non-patent literature 2].

$CoRA_{ME}^{NC}$ is rate-energy region in case of performing wireless power transfer without applying transfer diversity in the cooperative resource allocation technique, and $CoRA_{ME}$ is rate-energy performance result in case of performing optimum cooperative wireless power transfer without applying the subcarrier selection method. Last, $CoRA_{SCsel}$ is performance of the repetitive cooperative transfer technique proposed in the example embodiments, and it may be seen that it achieves better performance than all other techniques.

Figure 5:
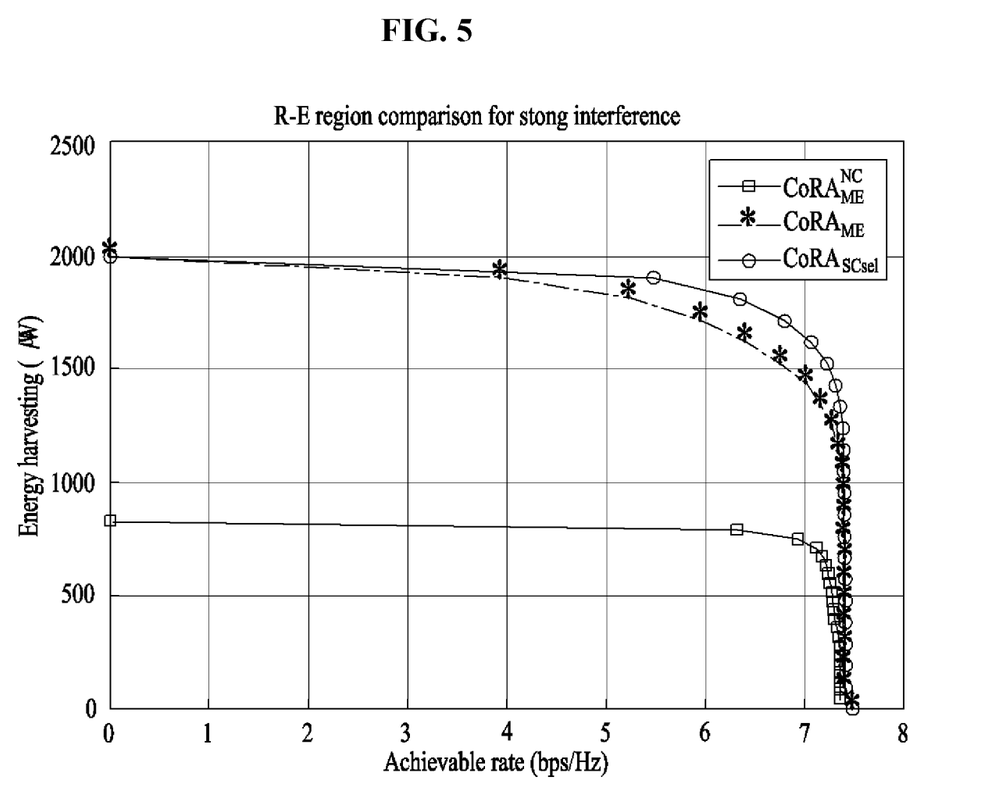
FIG. 5 illustrates an experimental result for performance evaluation according to an example of embodiments.

FIG. 5 illustrates an experimental result for performance evaluation according to an example of embodiments.

Referring to FIG. 5, the corresponding experimental result is performance result in case that there are three EAPs, and each four ID receivers and EH receivers.

Through the corresponding result, it may be seen that the proposed technique according to the example embodiments may be extended to multiple users and multiple EAPs, and it still shows the best performance even in the extended system.

The example embodiments may be applied to all wireless network based on OFDM (Orthogonal Frequency Division Multiple) in which numerous small wireless devices are connected due to the rapid development of wireless communication technology. User convenience may be maximized by wirelessly supplying continuous power to the wireless devices. The example embodiments may be applied to all systems based on OFDM such as WiFi network, LTE, 5G, Beyond 5G, and the like. For example, the example embodiments may be provided for information exchange and power transfer in network in which numerous IoT (Internet of Things) devices and sensors such as Smart home, smart factory, and the like are existed.

As described above, according to example embodiments, it may increase receiving energy through the cooperative wireless power transfer in which the transfer diversity is applied by using the predefined energy symbol, and it may improve information transfer rate by preventing transfer power waste for information transfer in subcarrier having strong interference. Also, the ID receiver may use the existing OFDM (Orthogonal Frequency Division Multiple) receiver without additional functions for removing interference due to energy symbol.

In addition, according to example embodiments, it may maintain information transfer in network in which numerous wireless devices are connected, and it may configure network which may wirelessly provide power.

Currently, with the development of wireless mobile communication technology, numerous wireless devices are increasing, and users using the wireless devices are constantly requiring wireless charging. The use of wireless devices continues in general workplace, offices, and various transport facilities, and if battery duration of the devices may be increased with wireless charging for such wireless devices, it may provide convenience to numerous users.

Furthermore, various IoT devices and sensors which are main elements configuring smart home and smart factory may be arranged in anywhere, and the power of them is provided based on battery. According to example embodiments, it may enable to continuously use wirelessly the battery of numerous IoT devices and sensors, and may transfer information at the same time, thus it may provide user convenience without the need to install additional base station.

The units described herein may be implemented using hardware components, software components, and/or a combination thereof. For example, a processing device may be implemented using one or more general-purpose or special purpose computers, such as, for example, a processor, a controller and an ALU (arithmetic logic unit), a digital signal processor, a microcomputer, a FPGA (field programmable gate array), a PLU (programmable logic unit), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied in any type of machine, component, physical or virtual equipment, computer storage medium or device to provide instructions or data to or be interpreted by the processing device. The software also may be distributed over network coupled computer systems so that the software is stored and executed in a distributed fashion. In particular, the software and data may be stored by one or more computer readable recording mediums.

The method according to the example embodiments may be implemented in a form of program instruction which may be performed through various computer means and recorded in computer-readable media. The media may also include, alone or in combination with the program instructions, data files, data structures, and the like. The media may be continuously storing a program which may be executed with a computer, or temporarily storing for execution or download. Also, the media may be various recording means or storing means in a form of single or a plurality of hardware which are combined, but it is not limited to a media directly accessed to any computer system, and it may be distributed on network. Examples of the media include magnetic media such as hard disks, floppy disks, and magnetic tape; optical media such as CD ROM disks and DVD; magneto-optical media such as floptical disks; and hardware devices that are specially configured to store and perform program instructions, such as ROM (read-only memory), RAM (random access memory), flash memory, and the like. Examples of program instructions include both machine code, such as produced by a compiler, and higher level code that may be executed by the computer using an interpreter.

While certain example embodiments and implementations have been described herein, other embodiments and modifications will be apparent from this description. Accordingly, the invention is not limited to such embodiments, but rather to the broader scope of the presented claims and various obvious modifications and equivalent arrangements.

The invention claimed is:

1. A cooperative resource allocation method for downlink simultaneous wireless information and power transfer network, which is implemented through a central processor, comprising:
    allocating subcarrier for wireless information transfer and power transfer; and
    allocating power for wireless information transfer with the allocated subcarrier and divided transfer power, wherein the allocating subcarrier is configured to set candidates of subcarrier by using weighting factor, and select subcarrier having a minimum channel gain between ID receivers in the HAP among the subcarrier candidates.

2. The cooperative resource allocation method of claim 1, wherein the cooperative resource allocation method is configured to arrange a plurality of EAPs (Energy Access Point) in a wireless power transfer coverage configured by a HAP (Hybrid Access Point) in order to overcome receiving sensitivity difference between an EH (Energy Harvesting) receiver and an ID (Information Decoding) receiver.

3. The cooperative resource allocation method of claim 1, wherein the allocating subcarrier comprises:
    first selecting subcarrier for wireless power transfer; and
    when the subcarrier is selected, allocating the remaining subcarrier to subcarrier for wireless information transfer according to a subcarrier splitting method.

4. The cooperative resource allocation method of claim 3, wherein the subcarrier splitting method is configured to transfer information symbol and energy symbol with total transfer power divided to each exclusive subcarrier by using characteristics of OFDM (Orthogonal Frequency Division Multiple) with the EH receiver or ID receiver in the HAP.

5. The cooperative resource allocation method of claim 1, wherein the allocating subcarrier is configured to select the subcarrier simultaneously meeting energy requirements of the EH receiver preset based on the subcarrier splitting method and maximizing data rate of the ID receiver.

6. The cooperative resource allocation method of claim 1, wherein the allocating subcarrier is configured to form the divided transfer power according to ratio by determining the ratio of transfer power to be used for wireless power transfer in the HAP.

7. The cooperative resource allocation method of claim 1, wherein the allocating power is configured to readjust the divided transfer power for wireless power transfer and wireless information transfer by considering energy secured through the subcarrier for wireless information transfer.

8. The cooperative resource allocation method of claim 1, wherein the allocating power is configured to perform cooperative wireless power transfer in which transfer diversity is applied by using predefined energy symbol, and increase receiving power in the EH receiver.

9. A cooperative resource allocation apparatus for downlink simultaneous wireless information and power transfer network, comprising:
    a subcarrier allocating unit for allocating subcarrier for wireless information transfer and power transfer; and
    a power allocating unit for allocating power for wireless information transfer with the allocated subcarrier and divided transfer power, wherein the subcarrier allocating unit is configured to set candidates of subcarrier by using weighting factor, and select subcarrier having a minimum channel gain between ID receivers in the HAP among the subcarrier candidates.

10. The cooperative resource allocation apparatus of claim 9, wherein the cooperative resource allocation apparatus is configured to arrange a plurality of EAPs (Energy Access Point) in a wireless power transfer coverage configured by a HAP (Hybrid Access Point) in order to overcome receiving sensitivity difference between an EH (Energy Harvesting) receiver and an ID (Information Decoding) receiver.

11. The cooperative resource allocation apparatus of claim 9, wherein the subcarrier allocating unit is configured to first select subcarrier for wireless power transfer, and when the subcarrier is selected, allocate the remaining subcarrier to subcarrier for wireless information transfer according to a subcarrier splitting method.

12. The cooperative resource allocation apparatus of claim 11, wherein the subcarrier splitting method is configured to transfer information symbol and energy symbol with total transfer power divided to each exclusive subcarrier by using characteristics of OFDM (Orthogonal Frequency Division Multiple) with the EH receiver or ID receiver in the HAP.

13. The cooperative resource allocation apparatus of claim 9, wherein the subcarrier allocating unit is configured to select subcarrier simultaneously meeting energy requirements of the EH receiver preset based on the subcarrier splitting method and maximizing data rate of the ID receiver.

14. The cooperative resource allocation apparatus of claim 9, wherein the subcarrier allocating unit is configured to form the divided transfer power according to ratio by determining the ratio of transfer power to be used for wireless power transfer in the HAP.

15. The cooperative resource allocation apparatus of claim 9, wherein the power allocating unit is configured to readjust the divided transfer power for wireless power transfer and wireless information transfer by considering energy secured through the subcarrier for wireless information transfer.

16. The cooperative resource allocation apparatus of claim 9, wherein the power allocating unit is configured to perform cooperative wireless power transfer in which transfer diversity is applied by using the predefined energy symbol, and increase receiving power in the EH receiver.

* * * * *